United States Patent [19]

Becker

[11] 3,881,072

[45] Apr. 29, 1975

[54] AUDIBLE INDEXING FOR DICTATION APPARATUS

[76] Inventor: Frank E. Becker, 1895 Manassas Dr., Lexington, Ky. 40504

[22] Filed: June 20, 1973

[21] Appl. No.: 371,804

Related U.S. Application Data

[63] Continuation-in-part of Ser. No. 157,566, June 28, 1971, abandoned.

[52] U.S. Cl. .......... 179/100.1 DR; 360/86; 360/101; 360/105; 360/106; 360/107

[51] Int. Cl. .................. G11b 27/36; G11b 21/14; G11b 25/04

[58] Field of Search ........... 179/100.1 R, 100.1 DR, 179/6 E, 100.2 S, 100.3 D, 100.4 D, 100.1 PS; 340/174.1 C; 360/72, 55, 86, 87, 105, 106, 107, 137, 101

[56] References Cited

UNITED STATES PATENTS

| | | | |
|---|---|---|---|
| 1,272,262 | 7/1918 | Holland | 179/100.1 DR |
| 1,909,765 | 5/1933 | Jenkins | 179/100.3 D |
| 2,110,090 | 3/1938 | Ligh et al. | 179/100.3 D |
| 2,306,614 | 12/1942 | Clausen | 179/100.1 DR |
| 2,409,520 | 10/1946 | Thompson | 179/100.1 DR |
| 3,171,902 | 3/1965 | Jones et al. | 179/100.2 S |

*Primary Examiner*—Raymond F. Cardillo, Jr.
*Attorney, Agent, or Firm*—D. Kendall Cooper

[57] ABSTRACT

The present case is directed to a feature for dictation equipment that enables a dictator to indicate instructions directly on a recording medium for later use by a typist and that effectively eliminates separate index slips ordinarily required heretofore. The feature is adaptable for indicating ends of letters, and the like, as well as instructions for the transcriber. In a preferred embodiment, facilities are provided for the dictator to dictate instruction material simultaneously with a super-imposed tone signal that can be recognized later as signifying a special instruction. The feature is illustrated in conjunction with a disc-type recording and transcribing apparatus, but is adaptable for use with other kinds of media, such as belts, cards, etc.

2 Claims, 13 Drawing Figures

INVENTOR
FRANK E. BECKER
BY D. Kendall Cooper
ATTORNEY

AUDIBLE INDEXING FOR DICTATION APPARATUS

This is a continuation-in-part of application Ser. No. 157,566, filed June 28, 1971, now abandoned.

BACKGROUND OF THE INVENTION

U.S. Pat. No. 3,288,941, filed Dec. 30, 1963, issued Nov. 29, 1966 having M. P. Langendorf, et al., as inventors and entitled "Dictating System."

U.S. Pat. No. 3,610,634, filed Oct. 14, 1968, issued Oct. 5, 1971, having Fred W. Johnson, et al., as inventors and entitled "Dictating and Transcribing Apparatus Featuring Record Media Eject Control."

U.S. Pat. No. 3,729,201 filed Dec. 18, 1970, issued Apr. 24, 1973, having W. L. Dollenmayer as inventor and entitled "Miniature Disc Dictation Machine Featuring Absolute Synchronized Disc-Transducer Driving Arrangement."

U.S. Pat. No. 3,599,989, filed Nov. 17, 1969, issued Aug. 17, 1971 with H. R. Kruspe, et al. as inventors; entitled "Measured Review for Disc-Type Dictation Apparatus."

The foregoing references are considered representative of recording-reproducing machines in the prior art and serve as background information with respect to the present invention.

The Johnson, et al. and Langendorf patents are illustrative of systems making use of a belt-type dictation apparatus, Langendorf showing the use of tone signals to define ends of letters and letter lockout on the belt record media. The Dollenmayer and Kruspe patents describe magnetic disc recorder/reproducers with scanning means that are useful for positioning a magnetic head in relation to any of the tracks on the record disc.

Customarily, prior machines and systems have been predicated upon the principle that while a dictator is recording information to be transcribed at a later time, he will indicate instructions and ends of letters wherever necessary by appropriate marking, whether by a small perforation, ink marking, or other means on an index slip, such auxiliary information being helpful to the typist in preparing a transcribed copy for him. This has required that every recording comprise a record medium plus an accompanying index slip.

Marking directly on the medium (visible indexing) has been used to eliminate separate slips, but requires special erasure (liquids, solvents, etc).

The use of index slips originated with stylis media to indicate where a dictation error had been made so that the error would not be transcribed. With stylis recording, an index mark indicated dictation that was in error, rather than an instruction. The problem is not as great where magnetic media are used since the dictator can obtain error-free dictation.

Nevertheless, index slips are still used extensively for secretarial instruction, i.e. changes, other references, etc.; to separate letters when there is more than one on a medium; to indicate lengths of letters for centering on a page, etc.; and for indentification of dictator, and to identify (number) record media in sequence.

Secretarial instructions are one of two types: those that should be listened to before starting transcription, such as spelling of a name, special format for letter, carbon copy list, etc. and those that can be listened to when transcribing.

Disadvantages of index slips include the requirement that an extra piece of media be attached to the belt, disc, etc. which does nothing significant for the dictator; changing of index slips is awkward when recorders or transcribers have automatic media change (in-office or remote). Also, index slips are a consumable item that has to be purchased while the media are reusable. The marking mechanism is expensive. The typist has to search to know if she has an instruction or dictated text. There is an alignment problem between index slip and media, as well.

Index slips are least desireable with discs, and other flat "two dimensional" recording media because many discs can be stored in a small space and fed individually from a stack, either manually or automatically, into a recording machine. This enables a dictator to record only one letter on each disc if he so chooses. The typist then knows how many letters she has from the number of discs. To determine the length of a letter, she scans to the end of the recorded audio on the disc and reads the "permanent" index scale on the transcribing machine.

SUMMARY OF THE INVENTION

The present invention is concerned with a magnetic disc-type dictation and transcription apparatus for recording and reproducing audio information and is adaptable for use with portable machines, office machines, and systems configurations. As described in connection with a preferred embodiment, provision is made in the present system for recording a tone signal superimposed upon secretarial instructions simultaneously with the dictation of the instructions by the dictator.

The tone can be inserted electronically from an oscillator directly into the recording circuitry along with the electrical speech signal, or else it can be generated as an audible signal that is picked up through the microphone along with the acoustical speech signal. In either case, a special control is required at the microphone to distinguish dictation from instructions. This can be another "level" or "position" of the record bar on the microphone.

It is preferred that the tone signal comprise at least as much or more than one revolution of the disc, i.e., one recorded track on the disc in order that when placed in the transcribing unit, the typist can manually or automatically scan across the tracks on the disc and detect the special tone in order to determine what instructions have been given by the dictator in connection with the recorded information. The present system is also adaptable for indicating ends of letters, if desired, by recording the indexing tone between letters. This method of audible indexing with a superimposed tone has a number of distinct advantages over traditional visible indexing means. In addition to eliminating the nuisance of storing and handling a separate marking media, audible indexing provides absolute location of instructions on the recorded media, identification of instructions so that they will not be inadvertently typed along with the regular dictation, and magnetic erasure of the indexing tone along with the recorded dictation.

OBJECTS

A principle object of the present invention is to provide an indexing system for dictation equipment that is fundamentally a simple system for both the dictator and transcriptionist to use.

Another object of the present invention is to provide a system wherein special instructions, ends of letters, and the like, are indicated directly on the recording medium itself.

Another object of the invention is to provide a system of this nature in which instructions, and the like, are indicated by super-imposition of such instructional signals upon the dictation normally encountered.

Still another object of the invention is to provide a system of the nature set forth for providing indexing information which requires a minimum of attention and no complicated procedures for either the dictator or transcriptionist.

A still further object of the present invention is to provide an indexing technique that is useful regardless of the type of record medium used in the dictation apparatus. That is, the system is adaptable for use with discs, belts, cards, etc., as well as magnetic media or stylis-type media. Also, an object of the invention is to provide an indexing arrangement that is particularly useful in a dictating system having automatic feed of individual record media in an office product directly under control of the dictator or in a dictation system having remote control.

The foregoing and other objects, features, and advantages of the invention will be apparent from the following more particular description of the preferred embodiment of the invention as illustrated in the accompanying drawings.

DRAWINGS

Figures 1, 2, 3A:
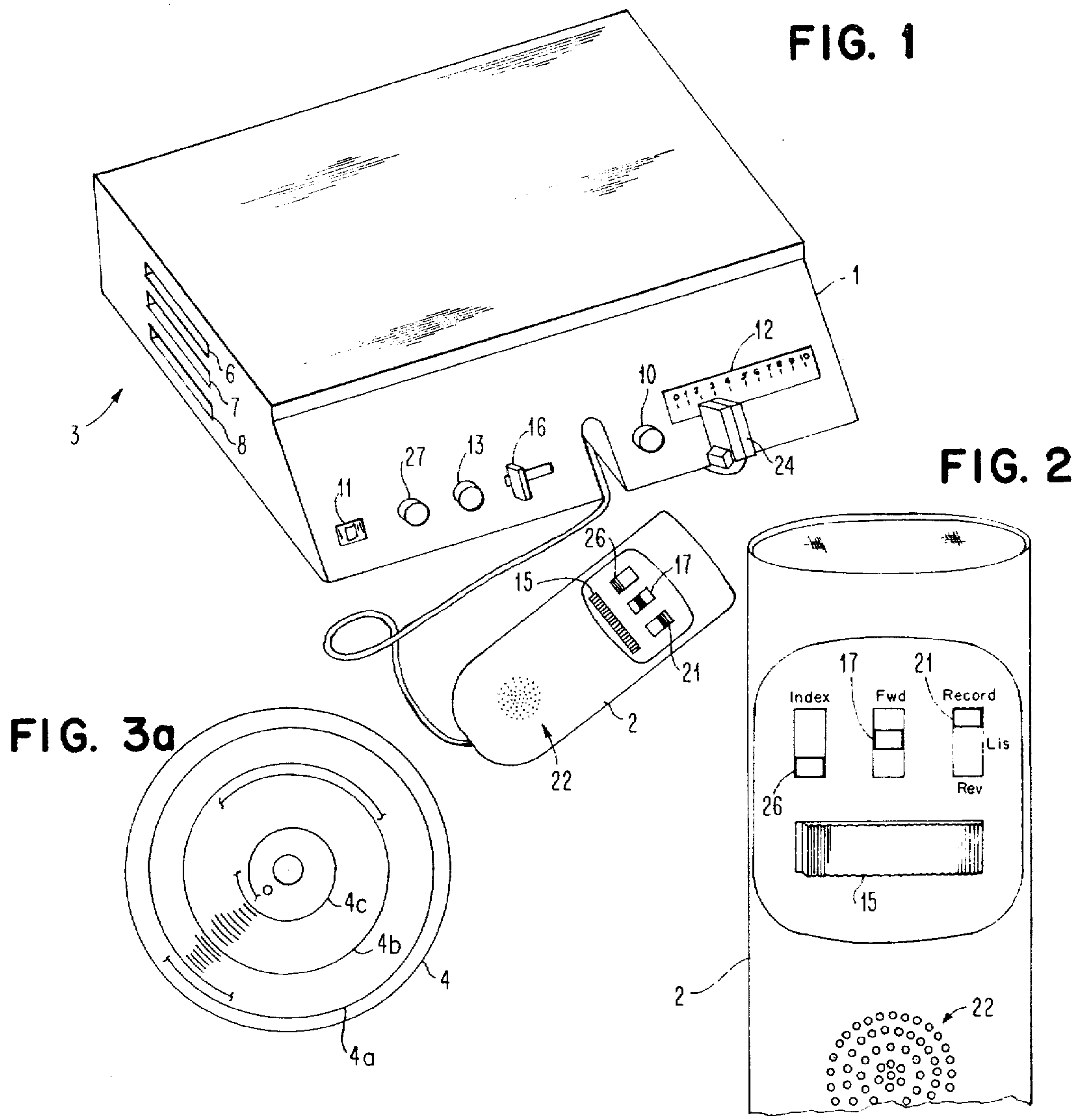
FIG. 1 represents an office type dictation machine having provision for automatic feeding of magnetic disc record members and control of recording and reproducing of information, as well as indexing, by means of a microphone.
FIG. 2 illustrates a portion of the microphone shown in FIG. 1 in greater detail.
Figure 3B:
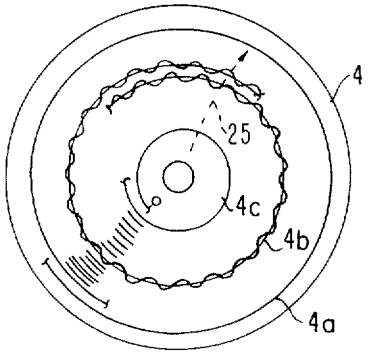

FIGS. 3*a* and 3*b* illustrate disc record members usable in the apparatus of FIG. 1 with FIG. 3*b* illustrating the superimposition of a tone signal for instruction purposes.

Figure 4:
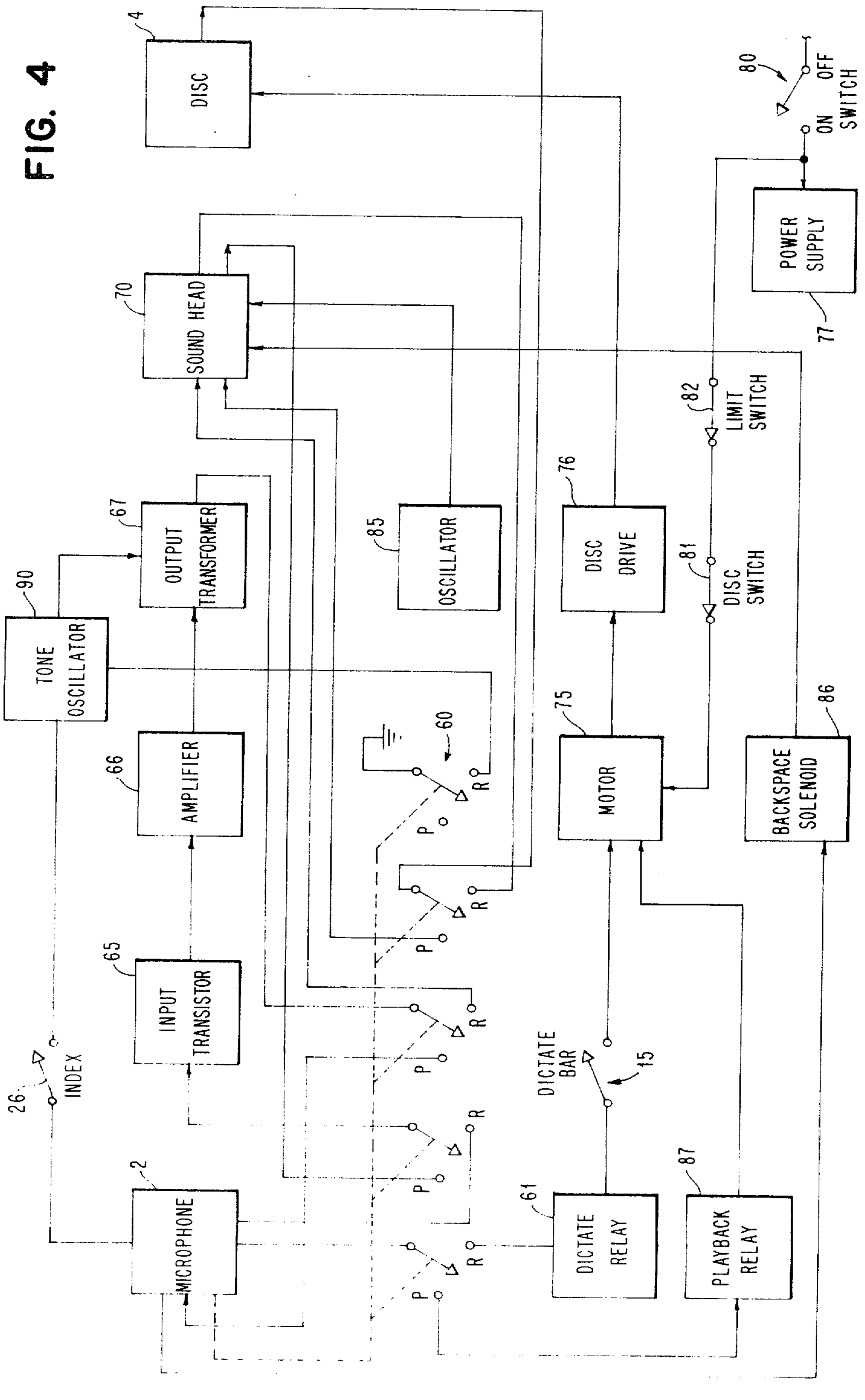

FIG. 4 set forth a circuit that is useful in the apparatus of FIG. 1.

Figure 5:
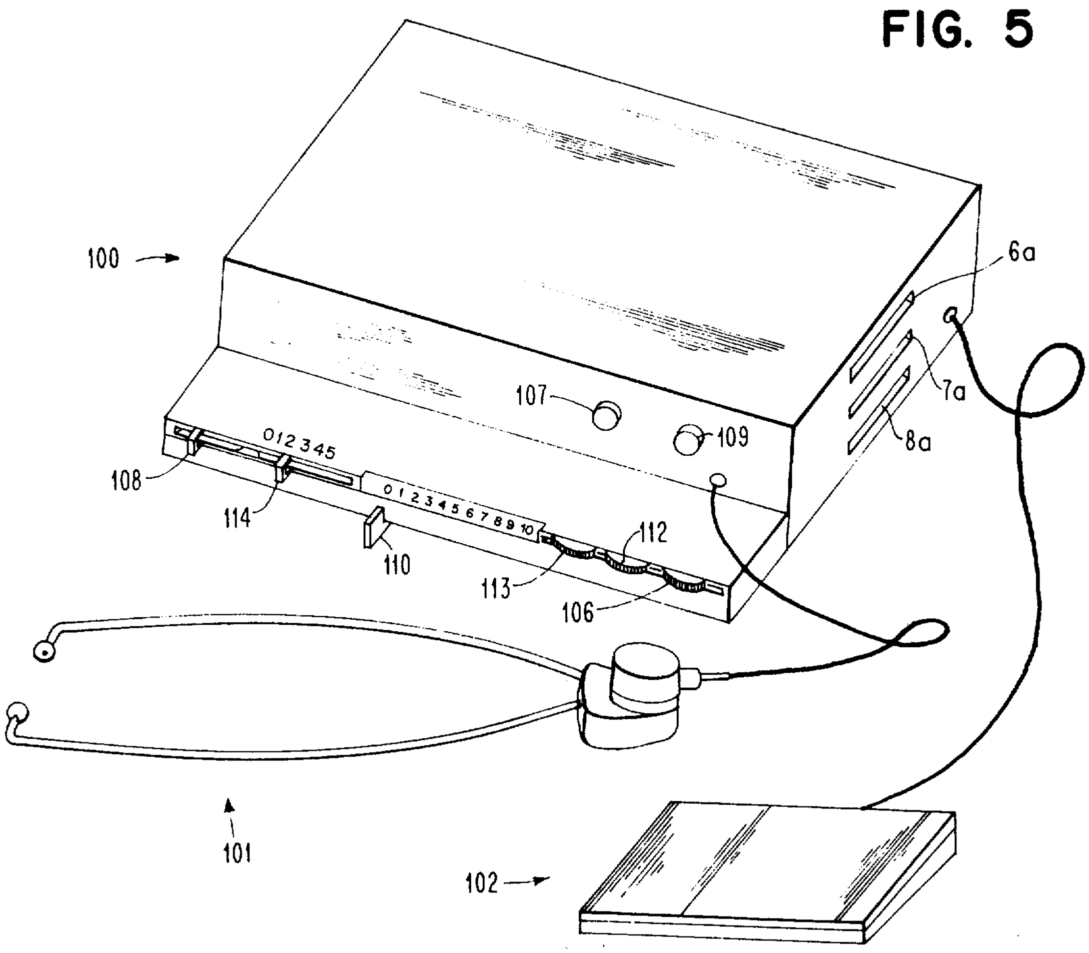

FIG. 5 illustrates a transcribing apparatus for disc-type record media such as those shown in FIGS. 3*a* and 3*b* and having an associated head set and transcriber foot control.

Figure 6:
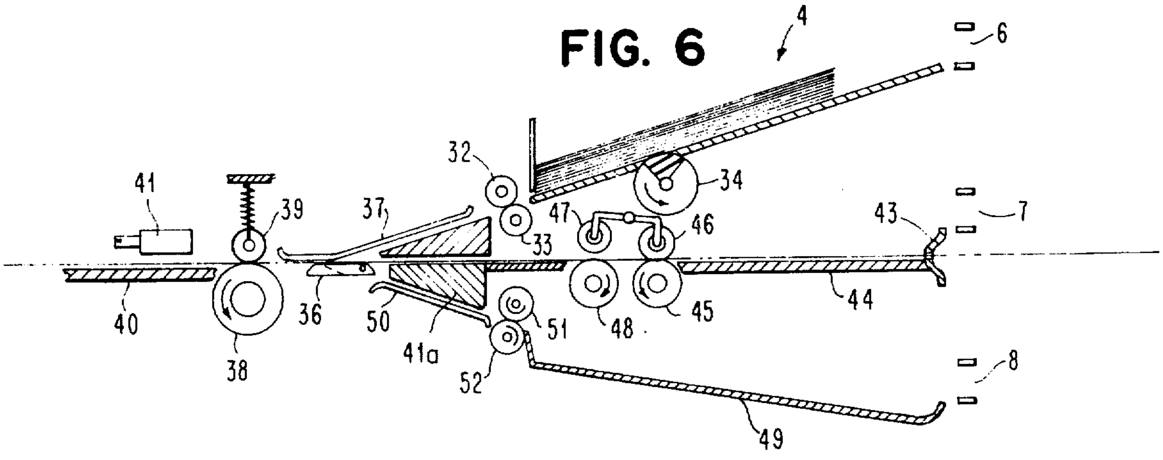

FIG. 6 illustrates a mechanism that is adaptable for feeding of magnetic record discs in either the dictation machine of FIG. 1 or the transcribing machine of FIG. 5.

Figure 7:
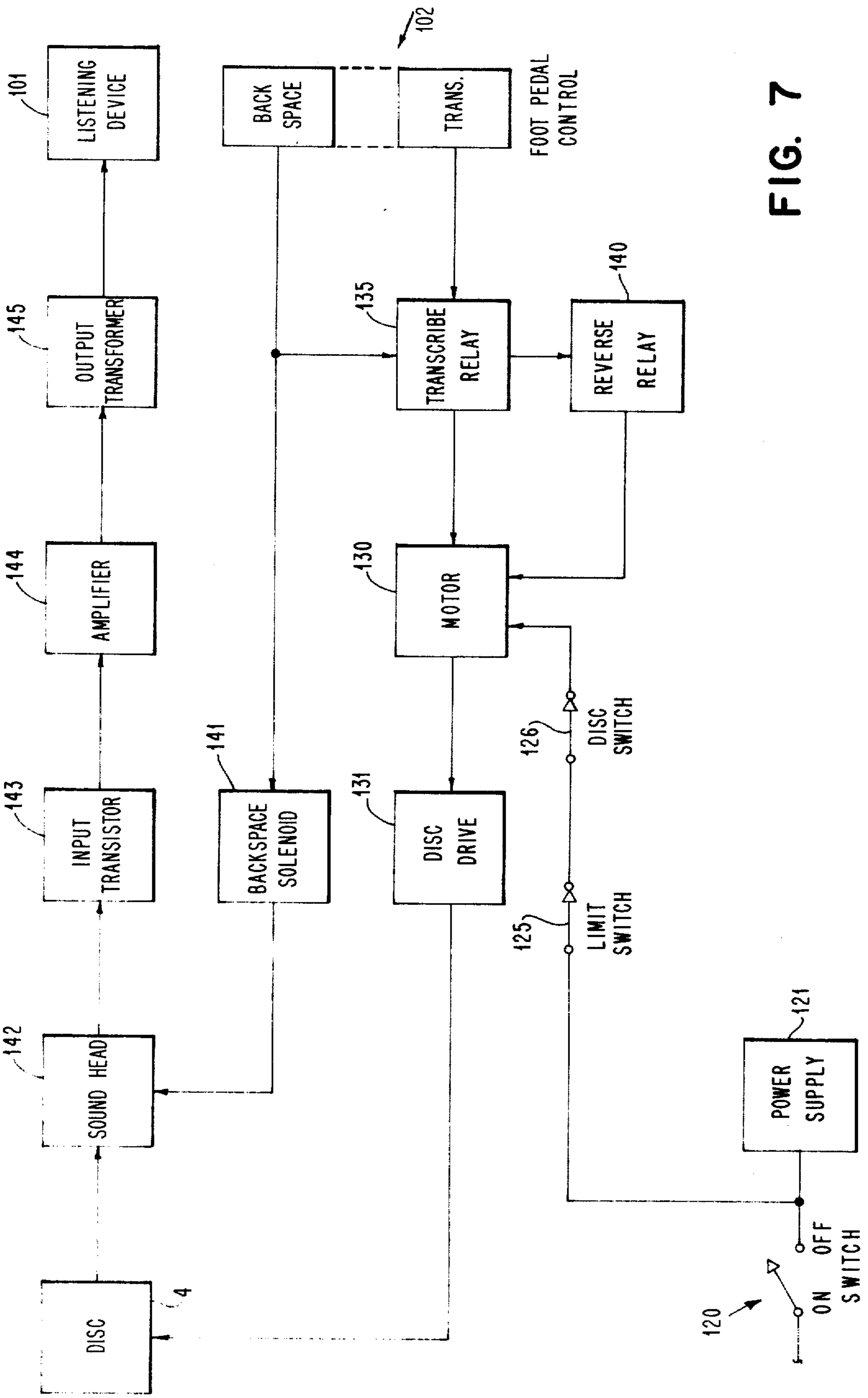

FIG. 7 illustrates a possible circuit for use in the transcribing unit of FIG. 5.

Figures 8A, 8B, 8C:
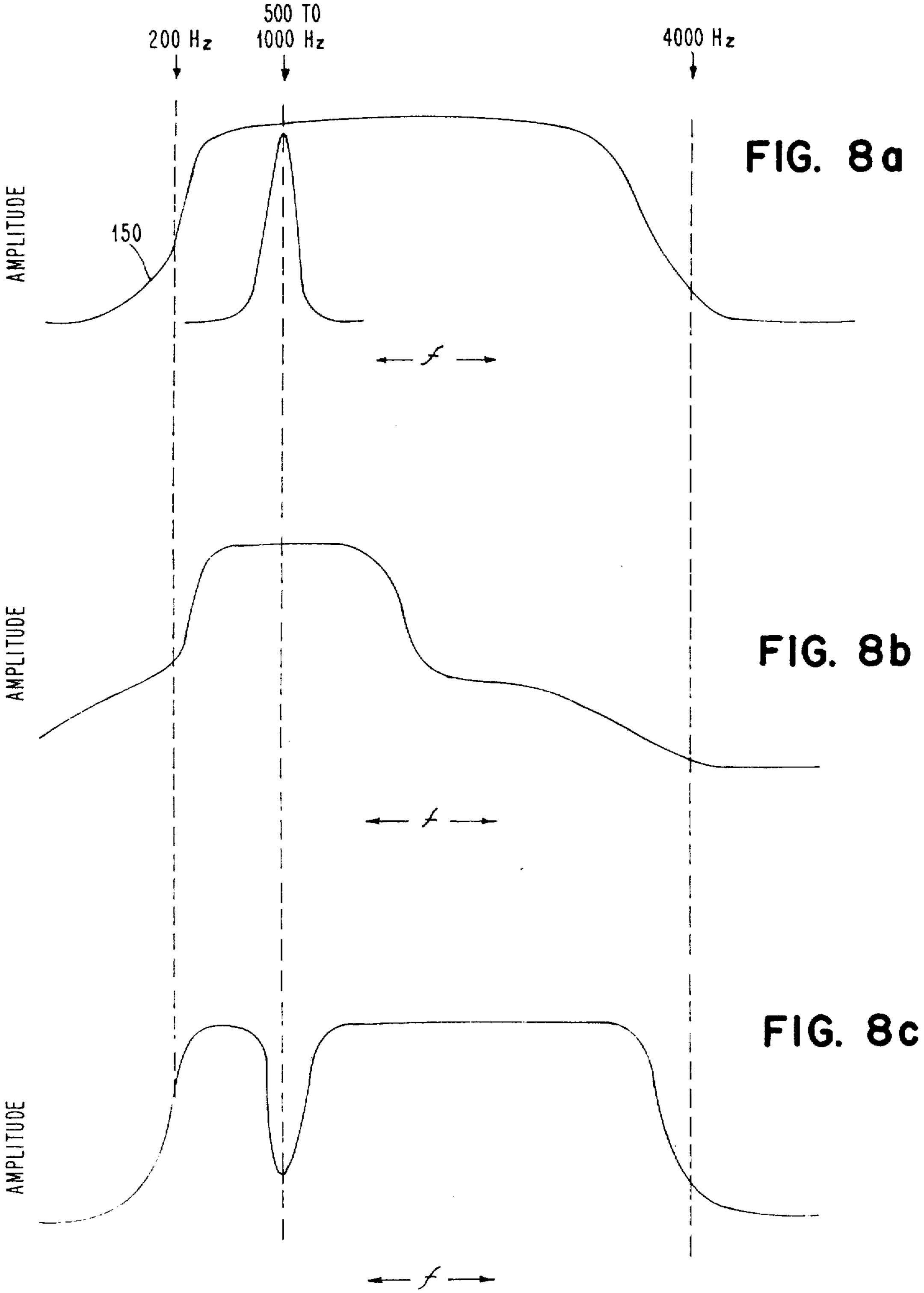

FIGS. 8*a*, 8*b*, and 8*c* set forth wave forms illustrative of typical audio band and tone signals with filtering conditions.

Figures 9, 10:
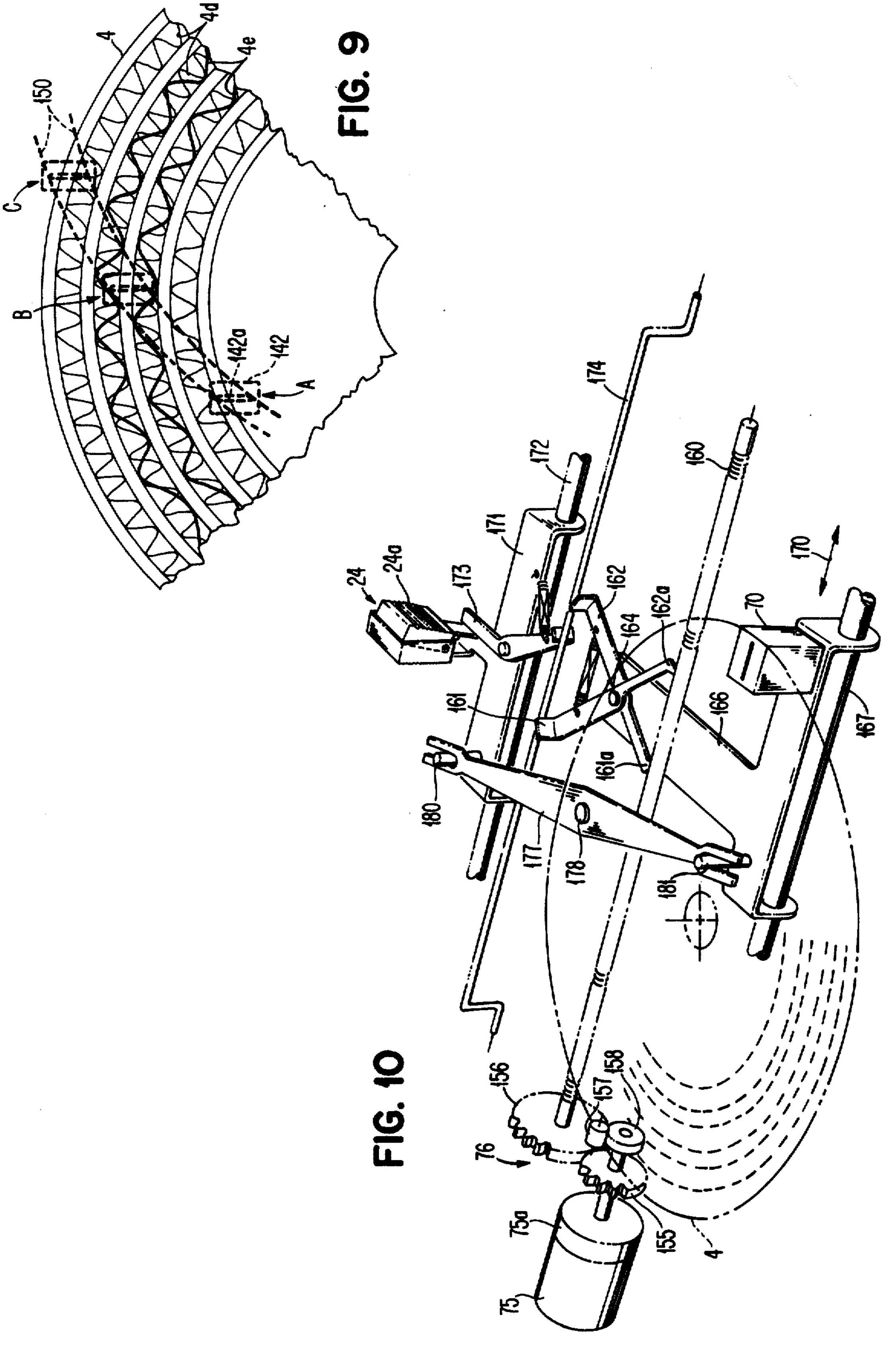

FIG. 9 is an enlarged view of a typical disc having tone signals superimposed on the audio signals.

FIG. 10 illustrates various driving and scanning mechanisms.

DETAILED DESCRIPTION

Disc Dictation Machine

FIG. 1 illustrates a magnetic disc dicatation machine 1 having a microphone 2 and various facilities. The dictation apparatus of FIG. 1 makes use of a disc loading and unloading mechanism 3 that is more particularly illustrated in FIG. 6. This mechanism comprises three disc slots 6, 7, and 8 for entry and ejection of discs during operation.

The dictation unit 1, FIG. 1, comprises various controls and operating elements as set forth below:

| | |
|---|---|
| Cord Retract Button 10 | Machine Speaker, not shown |
| Voice Level Indicator 11 | Operating Key 21 |
| Index Scale 12 | Microphone Speaker 22 |
| Volume Control 13 | Scanner 24 |
| Dictate Bar 15 | Index Key 26 |
| Tuning Lever 16 | Feed Button 27 |
| Forward Space Key 17 | |

These items are known in the art and need not be described further.

As a matter of convenience, a typical operation of the dictation machine of FIGS. 1 and 2 will be described with reference particularly to FIGS. 3*a*, 3*b*, 4 and 6. In preparing for dictation, the dictator makes use of the disc loading/unloading mechanism shown in FIG. 6. The mechanism of FIG. 6 is described as useful for loading, feeding, and unloading of discs.

In this multiple path disc feeding device, discs are automatically fed from a disc hopper to a disc transport for processing upon depression of feed button 27, manually fed to the disc transport for processing, automatically ejected from the disc transport to the manual feeding station, or automatically ejected from the disc transport to a disc stacking bin.

Discs are bottom-fed from disc hopper 6 to continuously rotating drive rolls 32 and 33 when a clutch, not shown, is engaged to drive picker roller 34 through one revolution. A disc is then driven by rolls 32 and 33 over member 35 and gate 36 which is in its solid line position 38 and actuated idler roll 39. Next, rolls 38 and 39 cause the disc to move to the extreme left over bed member 40 until the disc is clear of member 35. A second oppositely rotating drive roll and idler wheel combination is located coaxially with rolls 38 and 39 and is utilized in conjunction with them to drive the disc past magnetic transducer 41. The disc is ejected over bed 40, gate 36, member 41*a*, and bed 42.

A disc can be manually entered through throat member 43 over bed 44 until it engages continuously rotating drive roll 45 and idler 46 which is normally biased into engagement with roll 45. Then the disc is driven by roll 45 over bed 42, member 41*a*, and gate 36 to roll 38 whereupon operation is the same as that described above with respect to hopper fed discs.

Discs are ejected through member 43 by causing the disc to be driven to the extreme right by a drive roll, not shown, which is coaxial with roll 38. Idler wheel 47 is then rocked into engagement with drive roll 48, thus disengaging wheel 46 from roll 45. The disc is next driven over bed 44 through throat 43.

Discs are ejected into bin 49 when gate 36 pivots to its dotted line position. The disc is then driven to the right under gate 36 and member 41a and over member 50 to continuously rotating drive rolls 51 and 52. The disc is then fed by these drive rolls into bin 49, and may be removed from exit 8.

Also in preparation for the dictation of material, the dictator moves the key button 21 to the upper "record" position. This moves a switch assembly 60, FIG. 4, into the record or "R" position to prepare the dictation circuits for recording. This activates the dictate relay 61 and conditions the circuits so that audio inputs to microphone 2 are routed through an input transistor circuit 65 and amplifier 66, and an output transformer 67 to a magnetic sound head 70 for recording on the disc 4. The routing of the signals during recording is fairly apparent by inspection of the circuit of FIG. 4. The actual recording of dictated material takes place when the dictator depresses dictate bar 15 to activate motor 75 and a disc drive block 76 in order to drive disc member 4. The apparatus has the usual power supply 77 which may be activated by an on-off switch 80 (not shown in FIG. 1) and necessitating the continued closure of disc switch 81 and limit switch 82 representing the presence of the disc and the end of disc recording, respectively. An oscillator circuit 85 provides the usual high frequency bias signal for application to magnetic sound head 70 and in order to establish greater linearity of the recorded signal. The dictation unit also includes a back space solenoid 86 that is operable each time the keybutton 21 is moved to the lowermost Reverse (Rev) position to back step sound head 70 in relation to disc 4 in order to review previously dictated material. Keybutton 21 on microphone 2 is spring loaded to the center Listen (Lis) position which corresponds to a Playback position of switch 60 in FIG. 4 designated "P". In this position, a Playback relay 87 is energized instead of Dictate relay 61. Thereupon, motor 75 is energized to activate disc drive 76 and rotate disc 4 with respect to sound head 70. The dictator can review previously dictated material.

Disc Recording and Indexing

Disc 4 is shown in greater detail in FIGS. 3*a* and 3*b*. Typically, during recording a spiral track comprising sections 4*a*, 4*b*, and 4*c* is recorded on disc 4. It is understood that these track portions forming a helical or spiral path are merely representative portions of an entire track that extends from the outer periphery to the inner section of disc 4. Such track can be considered as starting near the center of disc 4 and proceeding toward the outer periphery or vice versa, depending upon design requirements.

FIG. 3*b* illustrates an indexing operation making use of disc 4 and having the same track portions 4*a*, 4*b*, and 4*c*. When the dictator has reached a point where he feels it necessary to issue instructions to the transcriber, he depresses dictate bar 15 to close the corresponding switch in FIG. 4 as well as index button 26 on microphone 2, closing the corresponding switch 26, FIG. 4. This activates timer 63 which through Or circuit 64 in turn activates a tone oscillator 90 that provides a tone of predetermined frequency characteristic to output transformer 67 for super-imposition on the disc along with the regular amplified voice signals from the microphone. This is represented schematically in track portion 4*b* of disc 4, FIG. 3*b*. Recording of the tone for at least one complete revolution is effected by operating motor 75 from Or circuit 64. Timer 63 is selected to have a sufficient time out cycle for insuring the operation of motor 75 for at least one complete revolution of disc 4.

Naturally, if the index switch 26 remains closed after timer 63 times out, continued activation of tone oscillator 90 and motor 75 is insured by the control signal on line 68.

Upon completion of recording of the entire material on the particular disc presently in use, the dictator operates a feed button 27 to initiate feeding of a new disc into position for recording. It is understood that index button 26 on microphone 2 may have more than one position in order to enable the superimposition of an end of letter tone on disc member 4 in accordance with the teachings in the Langendorf et al. patent in the reference section. The disc dictation unit of FIG. 1 offers an advantage, however, since it is possible to record each individual letter or document on an individual disc. This eliminates the necessity for marking ends of letters on the disc since only one letter or piece of dictated material occupies one disc.

After completing recording on one disc, or several discs, as may be required, the dictator will then convey the disc or group of discs to a transcriptionist for preparation of a typed copy during transcribing operations.

Transcribing Operations

FIG. 5 illustrates a disc transcribing unit that has automatic high speed or manual feeding of discs as well as unloading of discs at slots 6*a*, 7*a*, and 8*a* corresponding to slots 6–8 in FIG. 1. Transcribing unit 100 has an associated head set 101 and a foot control 102 the operation of which are known in the art.

For convenience, the various controls on transcribing unit 100, FIG. 5, are set forth below:

| | |
|---|---|
| Volume Dial 106 | Tone Dial 112 |
| Feed Button 107 | Speed Dial 113 |
| Tuning Lever 108 | Recall Lever 114 |
| Cord Retract Button 109 | |
| Scanner 110 | |

These items are also known in the art and need not be described further.

Preparation for Transcription

Upon receipt of the disc or group of discs, the typist inserts the discs into slots 6*a* or 7*a*, as appropriate, and initiates an automatic feeding operation by depressing button 107, using a mechanism such as that shown in FIG. 6 and in a manner comparable to that previously described for the dictation unit of FIG. 1. In contrast with the dictation unit, the transcribing unit has a playback mode only as illustrated in FIG. 7. Thus, if the equipment is turned on by on-off switch 120, not shown in FIG. 5, but shown in FIG. 7, power supply 121 is activated. The transcribing unit 100 includes a limit switch 125 and a disc switch 126 that serve functions corresponding to similar switches in the dictation unit. A motor 130 is connected to a disc drive block 131 to drive disc 4. This occurs when transcribe relay 135 is activated upon depression of foot control 102 and particularly in a direction to operate the transcribe (Trans) switch contacts in the foot control. As is known in the art, a reversal of the transducer with respect to the disc occurs upon depression of foot control 102 in a certain manner in order that the typist may review a desired portion of the dictated material as determined by the setting of recall lever 114 that is settable from 0 to approximately 5 words of recall. This is done under control of reverse relay 140, FIG. 7. The transcribing unit may also have back spacing facilities operable by back space switches in foot control 102 and a back space solenoid 141. During normal drive forward of disc 4, information previously recorded on disc 4 is sensed by sound head 142, supplied to an input transistor stage 143, an amplifier stage 144, and an output transformer 145 to a listening device which corresponds to head set 101.

Initial Detection of Tone Instruction Mark by Transcriptionist

Initially, prior to transcribing a particular disc, the transcriptionist will operate index lever 110, slowly scan sound head 142 across the tracks on disc 4 as indicated by arrow 25 in FIG. **3*b* while the disc is rotating. This may be done as taught in the Kruspe, et al. patent. During such cross/scanning the transcriptionist will hear the previously super-imposed tone in track 4 portion 4*b*, as an example, and immediately knows that an instruction has been recorded on the disc. It is evident that the transcriptionist need only position sound head 142 to the beginning of track portion 4*b*** by backspacing track to track or reversing the disc drive in order to play back the recorded instruction in this area of the disc to find out what special information the dictator intended at this point.

FIG. 9 represents a portion of disc 4 considerably enlarged and showing representative tracks having audio information recorded therein represented by waveform **4*d*. Certain of the tracks have a tone signal represented by waveform 4*e* superimposed thereon. Sound head 142 with gap 142*a* is slowly moved substantially transversely relative to the individual sound tracks on disc 4 while disc 4 is rotating. As shown in FIG. 9, this establishes a component of motion in the longitudinal direction of the recorded tone as the head is moved from position A to position B and thence to position C in a continuous sweeping manner represented by lines 150**.

Sweeping movement of head 142 relative to disc 4 enables pickup of the tone signal **4*e* as head 142 moves through position B. If desired, disc 4 could be rotated at a relatively faster speed than normal during this operation thereby enabling the sensing of a greater portion of tone signal 4*e***.

If a tone is recorded at the end of all dictated material, this may be detected by the transcriptionist to determine how much material has been recorded. Also, if more than one letter is recorded, a non-superimposed tone can be recorded at the end of each letter and indicates how long each letter is. In either case, reference is made to the index scale to determine how many minutes worth of material is involved.

Superimposed tones on the other hand are useful in avoiding a problem previously encountered since the transcriptionist knows when each tone is encountered that the related material is an instruction and is not to be typed. When separate index slips are used, this is not as easy to determine, and the typist may inadvertently type instruction material.

In this manner, it is apparent that instructions by the dictator are readily recorded on a record medium, whether it be a disc, belt, or card, and remain with the record medium at all times, thereby eliminating the necessity for a separate index slip as has been required in the past. The arrangement provides an inherent synchronization between the index or instruction portion and the corresponding recorded information on disc 4.

Scanning Mechanisms

FIG. 10 illustrates a possible scanning configuration for the dictation machine shown in FIG. 1, which is also useful in the transcribing unit of FIG. 5. This is based on scanning principles set forth in the Johnson, et al patent together with the disc driving principles set forth in the Dollenmayer patent. Considering the normal driving action first, motor 75 drives disc 4 through disc drive 76 comprising a reduction assembly **75*a*, gear elements 155 and 156, and drive rollers 157 and 158**.

Associated with gear 156 is a lead screw 160 arranged for rotary movement and for engagement by a set of pawls 161 and 162, end portions **161*a* and 162*a* actually engaging lead screw 160. Pawls 161 and 162 are mounted on stud 164 projecting from carriage 166. Carriage 166 is mounted for sliding movement on rod 167 leftwardly and rightwardly as indicated by arrow 170. This arrangement effects translational movement of head 70 relative to disc 4. The combined rotation of disc 4 and movement of head 70 results in the tracing of a spiral path on disc 4**.

In order to position head 70 from one location on disc 4 to another in a rapid fashion, means is provided for releasing the normal drive connections and enabling such rapid scanning action. Scanner 24 has an associated member 171 mounted for movement on rod 172 as indicated by arrow 170. To do this, button **24*a* is depressed while holding scanner 24. This moves bellcrank 173 clockwise in FIG. 10 thereby moving bail 174 toward lead screw 160. Bail 174 contacts pawls 161 and 162 thereby releasing them from engagement with lead screw 160. Lever 177 is assumed to be relatively mounted for rotation about stud 178 and is further interconnected with member 171 through pin 180 and with carriage 166 through pin 181. As can readily be observed, since head 70 is not now connected with lead screw 160, head 70 can now be moved back and forth as indicated by arrow 170, movement of scanner 24 to the right in FIG. 10 effecting movement of head 70 to the left in FIG. 10, and conversely. Scanning mechanisms similar to those shown in FIG. 10 are also provided in the transcribing unit for operation by scanner 110, FIG. 5, typically being used to scan disc 4 as illustrated in FIG. 9**.

Other Considerations

FIGS. **8*a*, 8*b* and 8*c*** illustrate other considerations in connection with the tone indexing of the present invention.

In FIG. **8*a*, wave form 150** represents a typical audio band range of, as an example, from 200 Hertz (Hz) to 4000 Hertz. A tone frequency super-imposed upon the audio material may be selected at any point in the audio band and as an example has been shown in the range of 500 to 1000 Hertz. The tone signal used for indexing, that is, instruction purposes, is superimposed directly upon any voice signals recorded in the audio band illustrated.

As shown in FIG. **8*b*, it is possible to provide additional circuitry particularly in the transcribing unit of FIG. 7 to render the tone signal to be more fully audible during the initial searching procedure by the transcriptionist in order to enable a more rapid location of such tone signal on disc 4, as shown in FIG. 8*b*. During transcription if desired, the tone could be filtered out altogether with appropriate circuitry as shown in FIG. 8*c*** thereby creating a location with no sound at all which would be readily detectable by the transcriptionist.

This is not as desirable, however, as making the tone more audible as illustrated in FIG. 8*b*.

While the invention has been particularly shown and described with reference to a preferred embodiment, it will be understood by those skilled in the art that various changes in form and detail may be made without departing from the spirit and scope of the invention.

What is claimed is:

1. Dictation apparatus having an indexing arrangement for recording on a record medium audio signals including special audio signals representative of dictated material said record medium accommodating audio signals recorded thereon in a spiral path comprising a plurality of concentric portions and wherein said audio signals and said special audio signals comprise audio segments that occupy less than one of said concentric portions as well as audio segments that occupy one or more of said concentric portions on said record medium, comprising:

a transducer for recording audio signals;

drive means for relatively driving said record medium and said transducer in proximity with respect to one another in order for said transducer to trace said spiral path on said record medium;

a source of audio signals representative of dictated material;

interconnecting means operable to interconnect said source of signals with said transducer;

mode control means for establishing a record mode of operation to operate said drive means and said interconnecting means in order to record said audio signals on said record medium by means of said transducer;

superimposed signal means operable concurrently with recording of a said special audio signal segment for recording a signal of predetermined constant frequency in superimposed relation with respect to all of said segment;

first control means operable when a special audio segment occupies at least one of said concentric portions to continue operation of said drive means and said superimposed signal means in order to record said superimposed signal only co-extensively with said special audio segment; and second control means interconnected with said drive means and said superimposed signal means and operable when a special audio segment occupies less than one of said concentric portions on said record medium and following termination of said special audio segment to continue operation of said drive means and said superimposed signal means in order to thereby record said superimposed signal continuously for at least one of said concentric portions even though said audio segment occupies less than one concentric portion of said signal path.

2. The apparatus of claim 1, wherein:

said first control means comprises a microphone interconnected with said dictation apparatus for controlling operations of said apparatus and selectively operable means on said microphone enabling dictator control of said superimposed signal means; and wherein said second control means comprises a timer circuit having a time-out cycle equal to the time required to traverse at least one of said concentric portions for continuing operation of said superimposed signal means.

* * * * *